July 17, 1962 T. C. COX 3,044,702
PARITY CHECKING APPARATUS FOR DIGITAL COMPUTER
Filed June 30, 1959
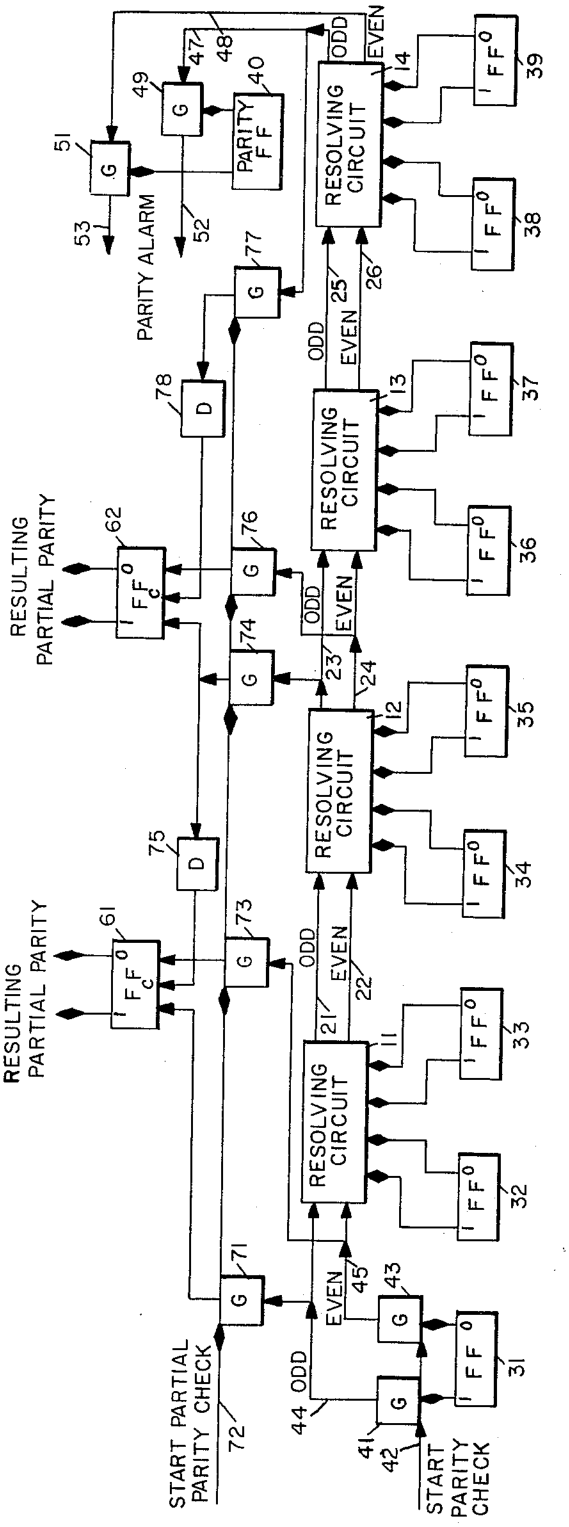
INVENTOR
THEODORE C. COX
BY Edgar H. Kent
ATTORNEY.

United States Patent Office 3,044,702
Patented July 17, 1962

3,044,702

PARITY CHECKING APPARATUS FOR DIGITAL COMPUTER

Theodore C. Cox, Rhinebeck, N.Y., assignor to International Business Machines Corporation, New York, N.Y., a corporation of New York Filed June 30, 1959, Ser. No. 823,931
6 Claims. (Cl. 235—153)

This invention relates to organizations of logical circuits to perform error detecting functions in electronic digital computers, and more particularly it concerns an improvement in certain checking circuitry of the type which works on the parity principle.

A common type of check which is used to detect malfunctions in electronic digital computers is the parity check. Thus a number held in a register is examined to determine whether the total number of its digits having a selected value is odd or even. The result is compared with the correct answer or parity as previously determined at some earlier stage in the processing of the number. If there is agreement, the assumption is that the number has been correctly handled subsequent to the time that its parity was determined initially.

A preferred way in which to determine the parity of a number standing in a register is with ripple type parity-resolving circuits which are individually responsive to the sense of signals representing digits and to a serially transmitted, parity indicating pulse. These circuits are connected in a series by means of two pulse-carrying lines, an odd line and an even line. Each parity-resolving circuit selects one of these lines for the transmission of the pulse to the next circuit in the series. The line selected in each case depends upon the sense of the digits in the particular stage or stages of the register to which the circuit is responsive and upon the selection of a line made by the preceding circuit. Once the last circuit in the series has received the pulse, therefore, it will be adapted to re-transmit the pulse on a line whose selection is indicative of the parity of the word as a whole.

A major advantage of this scheme is that it affords a way of making a parity determination very rapidly so as not to increase appreciably the time required to carry out mathematical computations. It does, however, require much more equipment than, for example, a simple counting circuit to count the parity in simple digit-by-digit fashion. Especially is this a disadvantage where, as is often the case with more advanced type computing machines, it is required to determine the parity of certain parts of a number or word as well as the whole word. For example, it is common in the art of digital computers to provide for the logical breakdown of words into at least two parts, the sense of one of which designates one of a class, and the sense of the other designates a variation within that class. In such cases it may and often is imperative to know the two partial parities as well as the overall parity of the word, that is, the parities of the digits representing the class and the variation. It is with the determination of such partial parities that the present invention is concerned.

The general object of the invention is to provide novel and improved apparatus for determining partial parities in combination with ripple type parity-resolving circuits.

A more specific object is to provide partial parity checking apparatus of the above-mentioned character which embodies a minimum amount of equipment and operates simply and reliably.

In brief, the apparatus according to the present invention embodies a bistable device or flip-flop, and a pulse delay device for each partial parity that is to be determined. The flip-flop is of the type that has a complementing input circuit, that is an input circuit which, in response to a pulse, is adapted to reverse its state. This complementing input circuit together with at least one other input circuit is arranged to receive at two different times, and from two different locations, a pulse that is rippling through a series of parity-resolving circuits. First, the pulse is adapted to act on the flip-flop at a stage in its progress through the resolving circuits when it is indicative of the parity of the digits immediately preceding that part of the number or word whose partial parity is to be determined. Second, the pulse is adapted to act upon the flip-flop at a stage in its travel when it is indicative of the parity of digits that precede and are included in the part of the word in interest. The delay device insures that the flip-flop has time to undergo successive changes in state and the ultimate state of the flip-flop is in this way adapted to represent the desired partial parity.

The novel features of the invention together with further objects and advantages thereof will become apparent from the following detailed description and the drawing to which it refers.

In the drawing, conventional arrowheads designate lines carrying pulses, and diamond-shaped arrowheads designate lines carrying signals of substantially longer duration commonly designated by those skilled in the art as D.C. levels. The apparatus according to the invention is illustrated in the form of a block diagram.

With reference now to the drawing, it will be observed that the ripple type circuits for resolving the parity of digits are designated 11–14 and that they are interconnected by odd and even pulse-carrying lines designated 21–26. A complete description of these circuits 11–14 is to be found in the copending application of Joseph J. Moyer, entitled Switching Circuit, bearing Serial Number 784,281, now Patent No. 3,011,073, and a filing date of December 31, 1958. The digits may be stored temporarily in any convenient manner as by a register of flip-flops. A register made up of nine flip-flops 31–39 to store a corresponding number of digits has been illustrated by way of example, excluding a parity digit which is stored in a flip-flop 40. Although they have not been shown for the sake of clarity, it will be understood that the flip-flops 31–40 have inputs which condition them to represent the digits as is conventional.

The output lines from the flip-flops are connected as shown. Thus, the ONE output line from flip-flop 31 conditions a gate circuit 41 which is sensed by a pulse on a line 42, labeled Start Parity Check. The ZERO output line from flip-flop 31 is applied as a conditioning input to a gate 43 which is likewise sensed by a pulse on the Start Parity Check line 42. The outputs of gates 41 and 43, as represented by lines 44 and 45, are connected as inputs to resolving circuit 11. As is apparent, these lines bear the same relation to resolving circuit 11 as do lines 21 and 22 to resolving circuit 12, lines 23 and 24 to resolving circuit 13, and so forth. In contrast to the output lines from flip-flop 31, the output lines from flip-flops 32 and 33 are applied directly to resolving circuit 11, the output lines from flip-flops 34 and 35 are applied directly to resolving circuit 13, and so forth. The final resolving circuit in the series 14 has a pair of output lines 47 and 48, and these are connected to gate circuits 49 and 51, respectively, for sensing. Gate circuits 49 and 51 are conditioned by the respective ZERO and ONE outputs of parity flip-flop 40, and the output lines from the gates are designated 52 and 53. As will appear, these output lines are adapted to provide a pulse indicating that the parity of the number held in the register of flip-flops 31–39 as determined by the resolving circuits 11–14 fails to check with the parity indication which has been entered in the parity flip-flop 40.

In addition to the overall parity indication which the resolving circuits provide, two flip-flops 61 and 62 are adapted to provide partial parity indications. In particular, flip-flop 61 provides an indication of the parity of the digits stored in flip-flops 32–35, and flip-flop 62, according to its state, provides an indication of the parity of the digits stored in flip-flops 36-39. To this end, each of the flip-flops 61, 62 is provided with a complementing input circuit "*c*" as well as ONE and ZERO input circuits. The ONE input circuit of flip-flop 61 is connected to the output of a gate 71 which is conditioned by a D.C. level on a line 72 and sensed by a pulse on the line 44. Similarly, the ZERO input circuit of the flip-flop 61 is connected to the output of a gate 73 which is conditioned by the same D.C. level as conditions gate 71 and which is sensed by a pulse on the line 45. Flip-flop 61 is complemented by a pulse transmitted by a gate 74 and a delay circuit 75. Gate 74 is sensed by a pulse from resolving circuit 12 on the line 23 and is conditioned by a level applied to the Start Partial Parity check line 71 which also serves to condition a pair of gates 76 and 77.

Pulses transmitted by the gates 74, 76, and 77 control the state of the flip-flop 62. Thus, gate 74 has its output connected to the ONE input circuit of flip-flop 62 as well as to the delay element 75, gate 76 has its output connected to the ZERO input circuit of flip-flop 62, and gate 77 has its output connected by way of a delay element 78 to the complementing input circuit of flip-flop 62. Sensing of gate 76 is by means of a pulse from the resolving circuit 12 on the line 24, and sensing of gate 77 is by means of a pulse from resolving circuit 14 on the line 47. Delay elements 75, 78 may be of any conventional type adapted to provide a delay in the neighborhood of 70 millimicroseconds, although those skilled in the art will recognize that the amount of delay required will depend to a certain extent on the nature of the flip-flops 61 and 62.

In operation, a D.C. level is applied to the line 72 to condition all the gates 71, 73, 74, 76 and 77. Accordingly, when an overall parity check is initiated by the application of a pulse to the line 42, flip-flop 61 will first be caused to assume a state, ONE or ZERO, depending upon the parity of the digits in the register preceding the digits stored in flip-flops 32–35. Since in the simplified example this involves a single-register stage as represented by flip-flop 31, a single digit is involved and its parity corresponds to its sense. On the basis of the sense or parity of this digit, and the senses of the digits stored in flip-flops 32 and 33, resolving circuit 11 re-transmits the pulse on a selected one of the lines 21, 22 indicating an odd or even parity up to that point. Resolving circuit 12 receives this pulse together with signals representing the digits in flip-flops 34 and 35, and in accordance therewith, re-transmits the pulse on one of the lines 23, 24. If the pulse is transmitted by way of line 23 indicating that the parity up until this point is odd, gate 74 is sensed and passes a pulse by way of delay element 75 to the complementing input circuit of flip-flop 61, thereby reversing its state. The following table shows at a glance the state the flip-flop 61 will assume depending upon the sense of the pulse entering resolving circuit 11 and the sense of the pulse re-transmitted by the resolving circuit 12:

| Parity In | Parity Out | State of Flip-Flop |
|---|---|---|
| Even | Even | ZERO. |
| Odd | Odd | Do. |
| Even | do | ONE. |
| Odd | Even | Do. |

From the above table it is apparent, therefore, that when the flip-flop 61 is in a ONE state, it necessarily represents that the parity of the digits stored by flip-flops 32–35 is odd. Conversely, when the flip-flop is in a ZERO state, it is apparent that the parity of these digits must have been even. It follows, therefore, that according to the invention, there has been provided a relatively simple and reliable way of determining the parity of a part only of a series of digits.

In like manner, the parity indication of the digits held in flip-flops 36–39 is provided by the flip-flop 62. Assuming that the pulse transmitted by the resolving circuit 12 represents an even parity, flip-flop 62 will first be caused to assume its ZERO state. If the overall parity of all the digits in the register is odd, however, a pulse from line 47 will be transmitted to the complementing input circuit of flip-flop 62 by way of delay element 78 to reverse the state of the flip-flop 62. Flip-flop 62 will then be standing in the ONE state. This is as it should be to indicate by way of example an odd parity for the digits stored by the flip-flops 36–39.

Those skilled in the art will recognize that instead of the odd output line from the resolving circuit 14, the even line might be used to sense the gate 77 which passes a pulse to the compementing input of flip-flop 62. This will reverse the sense of the indication provided by the flip-flop. In like manner, the sense of the indication provided by flip-flop 61 may optionally be reversed. Therefore, it will be understood that while the invention has been particularly shown and described with reference to a single preferred embodiment, various changes in form and details may be made therein without departing from the spirit and scope of the invention.

What is claimed is:

1. In an electronic digital computer including a series of circuit devices for determining the parity of a corresponding series of binary digit groups and for transmitting by way of succeeding devices in the series pulses representing the parity of the digits in the preceding groups, the output of each device providing an indication of the parity of the digits in the corresponding binary group and all preceding binary groups, whereby an indication of the parity of the digits in all the groups is ultimately obtained, the combination with said devices of apparatus to determine the parity of selected digits in a part only of the series of binary digit groups, said apparatus comprising a bistable device having input circuits to control its state in response to pulses, means to apply to said input circuits the parity indicating output from the circuit device corresponding to the last digit group in said part of the series and the parity indicating output from the circuit device corresponding to the digit group immediately preceding said part, and means to delay the pulses from one of said circuit devices with respect to the other.

2. In an electronic digital computer including a series of circuit devices for determining the parity of a corresponding series of binary digit groups and for transmitting by way of succeeding devices in the series pulses representing the parity of the digits in the preceding groups, whereby an indication of the parity of the digits in all the groups is ultimately obtained, the combination with said devices of apparatus to determine the parity of selected digits in a part only of the series of binary digit groups, said apparatus comprising a bistable device, means to permit said bistable device to assume a first of its states when the parity of the digits in the digit group immediately preceding said part of the series is odd, means to permit said bistable device to assume the second of its states when the parity of the digit in the digit group immediately preceding said part of the series is even, pulse delay means, and means to transmit by way of said delay means a pulse from the circuit device corresponding to the last digit group in said part of the series when the parity indication provided by said device has a predetermined value, said pulse being adapted to cause said bistable device to reverse its state.

3. In an electronic digital computer including a series of circuit devices for determining the parity of a corresponding series of binary digit groups and for transmitting by way of succeeding devices in the series pulses representing the parity of the digits in the preceding groups, whereby an indication of the parity of the digits in all the groups is ultimately obtained, the combination with said devices of apparatus to determine the parity of selected digits in a part only of the series of binary digit groups, said apparatus comprising a bistable device having first and second input circuits to produce the respective stable states of said device in response to pulses, and a third input circuit to reverse its state, means to apply a pulse to said first input circuit when the parity of the digits in the digit group immediately preceding said part of the series is even, means to apply a pulse to said second input circuit when the parity of the digits in the digit group immediately preceding said part of the series is odd, a pulse delay circuit, and means to transmit to said third input circuit by way of said delay circuit a pulse from the circut device corresponding to the last digit group in said part of the series when the parity indication provided by said device has a predetermined value.

4. In an electronic digital computer including serial type parity indicating circuitry for serially sampling the bits of a binary coded word and accumulating a parity indication of the entire word, said circuitry having outputs at points corresponding to bits in said binary coded word, each output indicating the parity of the preceding sampled portion of said word, means to store the parity indication of the sampled portion of said word immediately preceding a selected section of the word, and means responsive to a predetermined value of the parity indication output at the end of said selected section to complement the stored parity indication so that the resultant stored parity indication indicates the parity of the selected section of the binary coded word only.

5. In an electronic digital computer including means for storing a binary coded word, and means for generating the total parity of the entire stored word, said parity generating means being arranged to accumulate the parity of the preceding binary digit orders and having outputs indicative of the accumulated parity at certain of said orders, means for indicating the parity of a selected portion only of said binary coded word comprising means to sense the accumulated parity indication of the portion of the word preceding said selected section and means to complement said sensed indication only when the accumulated parity indication of said selected section and said preceding portion of the word has a predetermined value, said resulting sensed indication being an accurate parity indication of the selected section only.

6. The apparatus as claimed in claim 5 and further including a bistable device having first and second input circuits arranged to cause said bistable device to be set in first and second states respectively in response to pulses applied to said first and second input circuits and a third input circuit arranged to cause said bistable device to be complemented in response to a pulse applied to said third input circuit, means to apply a pulse to said first input circuit when the accumulated parity indication of said preceding portion is even, means to apply a pulse to said second input circuit when the accumulated parity indication of said preceding portion is odd, and means to apply a pulse to said third input circuit when the accumulated parity indication of said preceding portion and said selected section is said predetermined value.

References Cited in the file of this patent

UNITED STATES PATENTS

| | | |
|---|---|---|
| 2,674,727 | Spielberg | Apr. 6, 1954 |
| 2,719,959 | Hobbs | Oct. 4, 1955 |
| 2,848,607 | Maron | Aug. 19, 1958 |
| 2,894,684 | Nettleton | July 14, 1959 |
| 2,906,997 | Rabin et al. | Sept. 29, 1959 |